(12) United States Patent
Kaku

(10) Patent No.: US 10,331,225 B2
(45) Date of Patent: Jun. 25, 2019

(54) INFORMATION PROCESSING APPARATUS, DISPLAY CONTROLLING METHOD, AND COMPUTER-READABLE RECORDING MEDIUM

(71) Applicant: Yusho Kaku, Kanagawa (JP)

(72) Inventor: Yusho Kaku, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 15/341,609

(22) Filed: Nov. 2, 2016

(65) Prior Publication Data

US 2017/0131788 A1 May 11, 2017

(30) Foreign Application Priority Data

Nov. 6, 2015 (JP) ................................. 2015-218668

(51) Int. Cl.
| | | |
|---|---|---|
| G06F 3/023 | (2006.01) | |
| G06F 3/0488 | (2013.01) | |
| G06F 3/01 | (2006.01) | |

(52) U.S. Cl.
CPC ............ *G06F 3/0238* (2013.01); *G06F 3/018* (2013.01); *G06F 3/0233* (2013.01); *G06F 3/04886* (2013.01)

(58) Field of Classification Search
CPC ...... G06F 3/018; G06F 3/0233; G06F 3/0238; G06F 3/04886
See application file for complete search history.

(56) References Cited

U.S. PATENT DOCUMENTS

| | | | | |
|---|---|---|---|---|
| 2002/0167545 A1 | 11/2002 | Kang et al. | | |
| 2007/0013673 A1* | 1/2007 | Minari | ................ | G06F 3/0238 345/173 |
| 2008/0320390 A1* | 12/2008 | Semple | ................ | G06F 3/0227 715/700 |
| 2011/0276916 A1 | 11/2011 | Kunori | | |
| 2014/0152578 A1 | 6/2014 | Kuroda | | |
| 2014/0298238 A1 | 10/2014 | Kunori | | |
| 2014/0344747 A1 | 11/2014 | Ishigure | | |
| 2015/0091804 A1* | 4/2015 | Ito | ....................... | G06F 3/04883 345/168 |

FOREIGN PATENT DOCUMENTS

| | | |
|---|---|---|
| JP | 2006-239969 | 9/2006 |
| JP | 2011-237983 | 11/2011 |

OTHER PUBLICATIONS

Extended Search Report dated Mar. 16, 2017 in European Patent Application No. 16196194.1.
Summons to attend oral proceedings dated Aug. 22, 2018, in corresponding European Patent Application No. 16196194.1.
iLuvTrading: "Galaxy S6/Edge: How to Change Languages on Keyboard-Several Languages" You Tube, Jun. 11, 2015, pp. 1-4, XP054978549.

* cited by examiner

*Primary Examiner* — Afroza Chowdhury
(74) *Attorney, Agent, or Firm* — Oblon, McClelland, Maier & Neustadt, L.L.P.

(57) ABSTRACT

An information processing apparatus includes a display device, an interface to which a hardware keyboard is connectable, and circuitry. The circuitry is configured to perform a control of displaying a software keyboard in the display device, detect that a hardware keyboard is connected to the interface, determine a type of the detected hardware keyboard, and control a display of the software keyboard depending on the determined type of the hardware keyboard.

16 Claims, 11 Drawing Sheets

| TYPE INFORMATION | | | APPLICATION KIND IDENTIFYING INFORMATION | DISPLAY SETTING INFORMATION | |
|---|---|---|---|---|---|
| DEVICE NAME | MANUFACTURER | MODEL NUMBER | | SOFTWARE FULL KEYBOARD | SOFTWARE NUMERIC KEYPAD |
| KEYBOARD 1 | A | xx01 | SCANNER | NON-DISPLAY | NON-DISPLAY |
| | | | COPY | NON-DISPLAY | DISPLAY |
| | | | PRINTER | NON-DISPLAY | DISPLAY |
| | | | FACSIMILE | DISPLAY | DISPLAY |
| KEYBOARD 2 | A | xx02 | SCANNER | NON-DISPLAY | NON-DISPLAY |
| | | | ... | ... | ... |
| ... | ... | ... | ... | ... | ... |

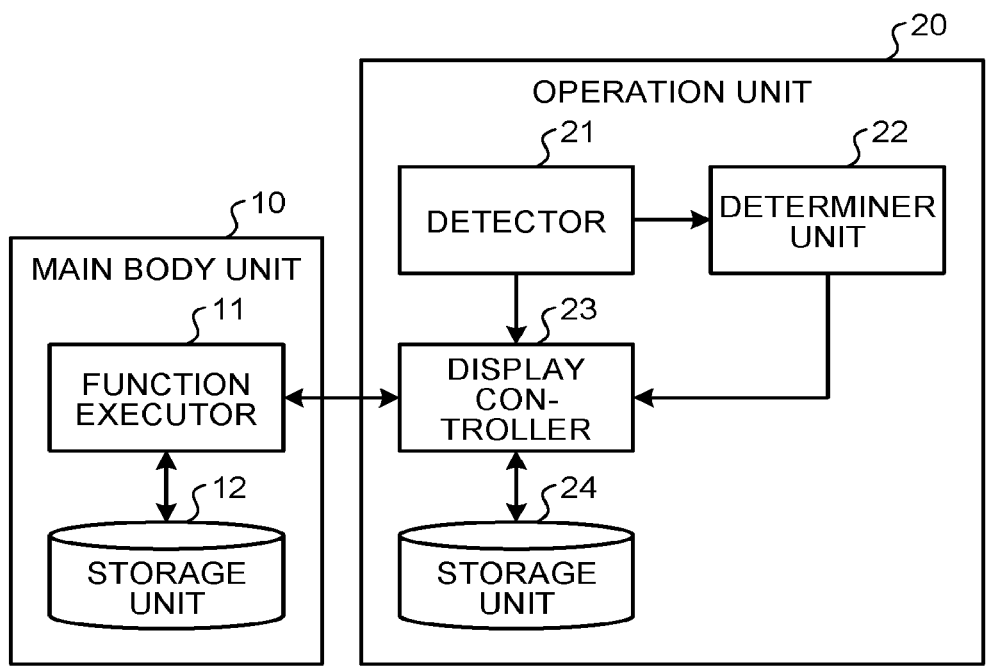

(a) ALPHABETS  (b) JAPANESE  (c) NUMBERS

| TYPE INFORMATION | | | NUMERIC KEYPAD IDENTIFYING INFORMATION | DISPLAY SETTING INFORMATION | |
|---|---|---|---|---|---|
| DEVICE NAME | MANUFACTURER | MODEL NUMBER | | SOFTWARE FULL KEYBOARD | SOFTWARE NUMERIC KEYPAD |
| KEYBOARD 1 | A | xx01 | TRUE | NON-DISPLAY | NON-DISPLAY |
| KEYBOARD 2 | A | xx02 | FALSE | DISPLAY | NON-DISPLAY |
| KEYBOARD 3 | B | xx03 | TRUE | NON-DISPLAY | DISPLAY |
| ... | ... | ... | ... | ... | ... |

| TYPE INFORMATION | | | APPLICATION KIND IDENTIFYING INFORMATION | DISPLAY SETTING INFORMATION | |
|---|---|---|---|---|---|
| DEVICE NAME | MANUFACTURER | MODEL NUMBER | | SOFTWARE FULL KEYBOARD | SOFTWARE NUMERIC KEYPAD |
| KEYBOARD 1 | A | xx01 | SCANNER | NON-DISPLAY | NON-DISPLAY |
| | | | COPY | NON-DISPLAY | DISPLAY |
| | | | PRINTER | NON-DISPLAY | DISPLAY |
| | | | FACSIMILE | DISPLAY | DISPLAY |
| KEYBOARD 2 | A | xx02 | SCANNER | NON-DISPLAY | NON-DISPLAY |
| | | | ... | ... | ... |
| ... | ... | ... | ... | ... | ... |

FIG.14

| APPLICATION | SOFTWARE FULL KEYBOARD | SOFTWARE NUMERIC KEYPAD |
|---|---|---|
| SCANNER | DISPLAY | NON-DISPLAY |
| COPY | DISPLAY | DISPLAY |
| PRINTER | NON-DISPLAY | NON-DISPLAY |
| FACSIMILE | NON-DISPLAY | DISPLAY |

KEYBOARD REGISTRATION

HARDWARE KEYBOARD TO REGISTER: KEYBOARD 4

1005   1006

INFORMATION PROCESSING APPARATUS, DISPLAY CONTROLLING METHOD, AND COMPUTER-READABLE RECORDING MEDIUM

CROSS-REFERENCE TO RELATED APPLICATION

The present application claims priority under 35 U.S.C. § 119 to Japanese Patent Application No. 2015-218668, filed Nov. 6, 2015. The contents of which are incorporated herein by reference in their entirety.

BACKGROUND OF THE INVENTION

1. Field of the Invention

The present invention relates to an information processing apparatus, a display controlling method, and a computer-readable recording medium.

2. Description of the Related Art

An information processing apparatus such as a PC (Personal Computer) and an MFP (Multifunction Peripheral) is generally provided with a connection interface such as a USB (Universal Serial Bus) to which an external device is connectable as disclosed in Japanese Unexamined Patent Application Publication No. 2006-239969, for example. It is possible in the information processing apparatus to input characters and the like via the hardware keyboard when a hardware keyboard is connected to the connection interface.

Besides, there is an information processing apparatus capable of displaying a software keyboard on a display screen and inputting characters and the like via the software keyboard. Conventionally, there is an information processing apparatus in which a software keyboard displayed on a display screen is made not displayed with a connection of a hardware keyboard. For example, an information processing apparatus with the Android® OS is configured to automatically delete a software keyboard in display when a hardware keyboard is connected.

However, since the software keyboard is closed with no exception irrespective of the type of the hardware keyboard in the conventional technique, there is a case of causing an inconvenient situation for a user. For example, since it is impossible in the conventional technique to determine the type of the hardware keyboard even when a numeric keypad for inputting numbers is connected as a hardware keyboard, a software keyboard for inputting characters (alphabets) is made not displayed. In this case, there is a problem that a user is not able to input alphabets when the numeric keypad is connected.

SUMMARY OF THE INVENTION

According to one aspect of the present invention, an information processing apparatus includes a display device, an interface to which a hardware keyboard is connectable, and circuitry. The circuitry is configured to perform a control of displaying a software keyboard in the display device, detect that a hardware keyboard is connected to the interface, determine a type of the detected hardware keyboard, and control a display of the software keyboard depending on the determined type of the hardware keyboard.

BRIEF DESCRIPTION OF THE DRAWINGS

FIG. 2 is a block diagram illustrating an example of a functional configuration of the MFP according to the first embodiment;

FIG. 3 is a schematic diagram of an example of device setting information stored in a storage unit according to the first embodiment;

FIG. 14 illustrates an example of a registration screen according to the third embodiment.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
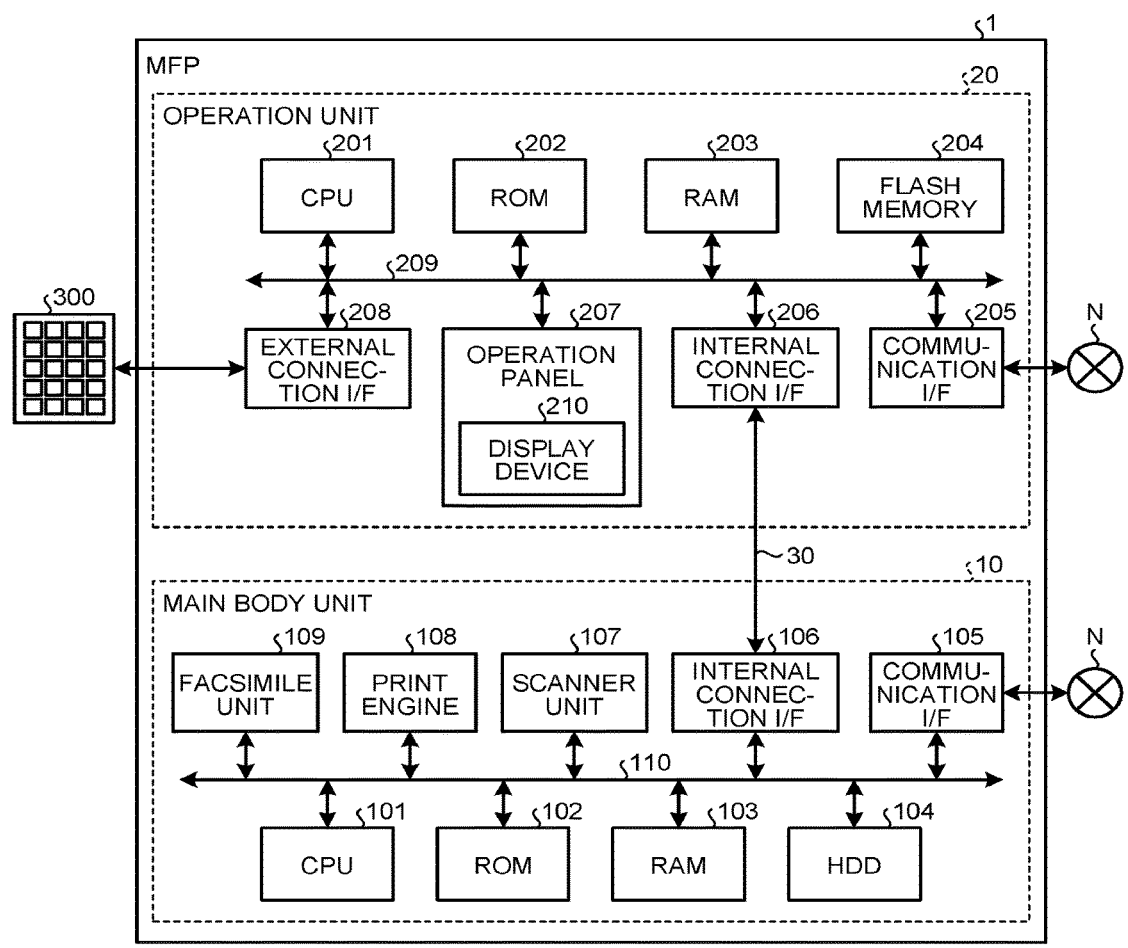
FIG. 1 is a block diagram illustrating an example of a hardware configuration of an MFP according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention will be explained in detail below with reference to the accompanying drawings.

An object of an embodiment is to provide an information processing apparatus, a display controlling method, and a computer-readable recording medium which are capable of controlling a display of a software keyboard depending on a type of a hardware keyboard.

While an example in which an information processing apparatus, a display controlling method, and a program according to the present invention are applied to an operation unit of an MFP will be explained in embodiments below, the device as an application target is not limited thereto.

First Embodiment

[Hardware Configuration of MFP]

FIG. 1 is a block diagram illustrating an example of a hardware configuration of an MFP 1 according to a first embodiment. As illustrated in FIG. 1, the MFP 1 is provided with a main body unit 10 capable of realizing various kinds of functions including a copying function, a scanner function, a facsimile function, a printing function, and the like; and an operation unit 20 that receives an operation by a user. Here, a concept of receiving an operation by a user includes receiving information (including a signal indicating coordinate values of a screen and the like) input depending on an operation by a user.

The main body unit 10 and the operation unit 20 are connected via a dedicated communication path 30 in such a manner that a mutual communication is enabled. For the communication path 30, an arbitrary standard may be adopted irrespective of being wired or wireless while a USB standard may be used, for example. The main body unit 10 is capable of performing an operation in accordance with an operation received by the operation unit 20. The main body unit 10 is capable of communicating with an external device such as a client PC and performing an operation in accordance with an instruction received from the external device.

A hardware configuration of the main body unit 10 will be explained first. As illustrated in FIG. 1, the main body unit 10 is provided with a CPU 101, a ROM 102, a RAM 103, an HDD (Hard Disc Drive) 104, a communication I/F (interface) 105, an internal connection I/F 106, a scanner unit 107, a print engine 108, and a facsimile unit 109. These units of the main body unit 10 are mutually connected via a system bus 110.

The CPU 101 is a processor of the main body unit 10. The CPU 101 controls an operation of the main body unit 10 as a whole. The CPU 101 uses the RAM 103 as a work area and executes programs stored in the ROM 102 or the HDD 104 to control the entire operation of the main body unit 10 and realize various kinds of functional units which will be explained later.

The communication I/F 105 is an interface for connection to a network N. The internal connection I/F 106 is an interface for communication with the operation unit 20 via the communication path 30.

The scanner unit 107 is a scanner device that scans and reads out an image of a document. The print engine 108 is a printing device that performs printing onto a sheet material such as paper. The facsimile unit 109 is a facsimile device that performs a facsimile communication via the communication I/F 105 and a not-shown communication network.

The CPU 101 cooperates with the scanner unit 107, the print engine 108, and the facsimile unit 109 to realize the copying function, the scanner function, the facsimile function, the printing function, and the like.

Next, a hardware configuration of the operation unit 20 will be explained. As illustrated in FIG. 1, the operation unit 20 is provided with a CPU 201, a ROM 202, a RAM 203, a flash memory 204, a communication I/F 205, an internal communication I/F 206, an operation panel 207, and an external connection I/F 208. These units of the operation unit 20 are mutually connected via a system bus 209.

The CPU 201 is a processor of the operation unit 20. The CPU 201 controls an operation of the operation unit 20 as a whole. The CPU 201 uses the RAM 203 as a work area and executes programs stored in the ROM 202 or the flash memory 204 to control the entire operation of the operation unit 20 and realize various kinds of functional units which will be explained later. A part of a storage area included in the flash memory 204 functions as a storage unit 24 (see FIG. 2) which will be explained later under a control of the CPU 201.

The communication I/F 205 is an interface for connection to a network N. The internal connection I/F 206 is an interface for communication with the main body unit 10 via the communication path 30.

The operation panel 207 is provided with a display device 210 such as a liquid crystal display (LCD) device and an organic EL display device equipped with a touch-sensitive panel function. The operation panel 207 may be provided with hardware keys such as an operation button and indicators such as a lamp.

The external connection I/F 208 is an interface to which an external device is detachably connected. For the external connection I/F 208, an arbitrary standard may be adopted irrespective of being wired or wireless while a USE standard and the Bluetooth® standard may be used, for example. To the external connection I/F 208, a hardware keyboard 300 that allows inputting characters and numbers is connected as an external device. Here, a concept of the hardware keyboard 300 includes a full keyboard for inputting characters and a numeric keypad for inputting numbers.

[Functional Configuration of MFP]

FIG. 2 is a block diagram illustrating an example of a functional configuration of the MFP 1 according to the first embodiment. As illustrated in FIG. 2, the main body unit 10 is provided with a function executor 11 and a storage unit 12 each as a functional unit.

The function executor 11 executes various kinds of applications stored in the storage unit 12 to realize various kinds of functions of the MFP 1. The storage unit 12 is realized by a storage medium such as the HDD 104 and stores various kinds of applications which can be executed by the function executor 11 (the CPU 101).

For example, the function executor 11 executes an application for copying function (hereinafter referred to as "copy application") stored in the storage unit 12 and controls the operations of scanner unit 107 and the print engine 108 to realize the copying function. Besides, the function executor 11 executes an application for scanner function (hereinafter referred to as "scanner application") stored in the storage unit 12 and controls the operation of the scanner unit 107 to realize the scanner function. Besides, the function executor 11 executes an application for facsimile function (hereinafter referred to as "facsimile application") stored in the storage unit 12 and controls the operations of the scanner unit 107 and the facsimile unit 109 to realize the facsimile function. Besides, the function executor 11 executes an application for printing function (hereinafter referred to as "printer application") stored in the storage unit 12 and controls the operation of the print engine 108 to realize the printing function.

As illustrated in FIG. 2, the operation unit 20 is provided with a detector 21, a determiner 22, a display controller 23, and a storage unit 24 each as a functional unit.

The detector 21 monitors a status of the external connection I/F 208. When the hardware keyboard 300 is connected to the external connection I/F 208, the detector 21 detects the fact that the hardware keyboard 300 is connected. The detector 21 also detects the event that the hardware keyboard 300 is connected to the external connection I/F 208.

When the detector 21 detects the connection of the hardware keyboard 300, the determiner 22 determines the type of the hardware keyboard 300. Specifically, the determiner 22 determines the type of the hardware keyboard 300 by obtaining type information that the hardware keyboard 300 retains via the external connection I/F 208.

Here, the type information indicates the type of the hardware keyboard 300. For example, the type information includes information indicating a device name, a manufacturer, a model number, and the like of the hardware keyboard 300. The type information may also include identifying information indicating whether or not the hardware keyboard 300 is a numeric keypad (numeric keypad identifying information which will be explained later), for example. When the numeric keypad identifying information is included in the type information, the determiner 22 determines whether or not the hardware keyboard 300 is a numeric keypad based on the numeric keypad identifying information.

The display controller 23 controls the display device 210 of the operation panel 207 to display information of various kinds. For example, the display controller 23 performs a control of displaying information appropriate to a user operation, information indicating an operational status of the MFP 1, information indicating a setting status, and the like. The display controller 23 cooperates with the function executor 11 of the main body unit 10 via the internal connection I/F 206 to perform a control of displaying a screen appropriate to an application (function) which is being executed by the function executor 11. For example, when the scanner application is being executed in the main body unit 10, the display controller 23 performs a control of displaying a screen concerning an operation and a setting of the scanner unit 107.

Besides, the display controller 23 performs a control of displaying a software keyboard that allows inputting characters and numbers in the display device 210. Here, a concept of the software keyboard includes a keyboard image for inputting characters (hereinafter referred to as "software full keyboard"), a numeric keypad image for inputting numbers (hereinafter referred to as "software numeric keypad"), and the like.

When the detector 21 detects the connection of the hardware keyboard 300, the display controller 23 controls a display of the software keyboard depending on the type (type information), determined by the determiner 22, of the hardware keyboard 300. Specifically, the display controller 23 controls the display of the software keyboard based on device setting information stored in the storage unit 24.

[Data Structure of Storage Unit]

FIG. 3 is a schematic diagram of an example of device setting information stored in the storage unit 24 according to the first embodiment. As illustrated in FIG. 3, display setting information which gives instruction of display or non-display of the software keyboard is stored, by being associated with the type information (device name, manufacturer, and model number) indicating each type of the hardware keyboard 300, in the device setting information. Here, the data structure of the device setting information is not limited to the example in FIG. 3.

When the detector 21 detects the connection of the hardware keyboard 300, the display controller 23 reads out, from the storage unit 24, the display setting information associated with the type (type information), determined by the determiner 22, of the hardware keyboard 300. The display controller 23 then controls the display of the software keyboard based on the read display setting information.

Here, the display control based on the display setting information may be configured to be performed at all times or may be configured to be performed when the statuses of the main body unit 10 and the operation unit 20 fall under a predetermined condition. For example, the display controller 23 may perform the display control based on the display setting information on condition that the software keyboard is being displayed.

Besides, when the display setting information associated with the type, determined by the determiner 22, of the hardware keyboard 300 is not stored in the storage unit 24, the display controller 23 performs a control of displaying a registration screen encouraging a registration of the display setting information in the display device 210.

[Processing Flow Concerning Software Keyboard Display]

Figure 4:
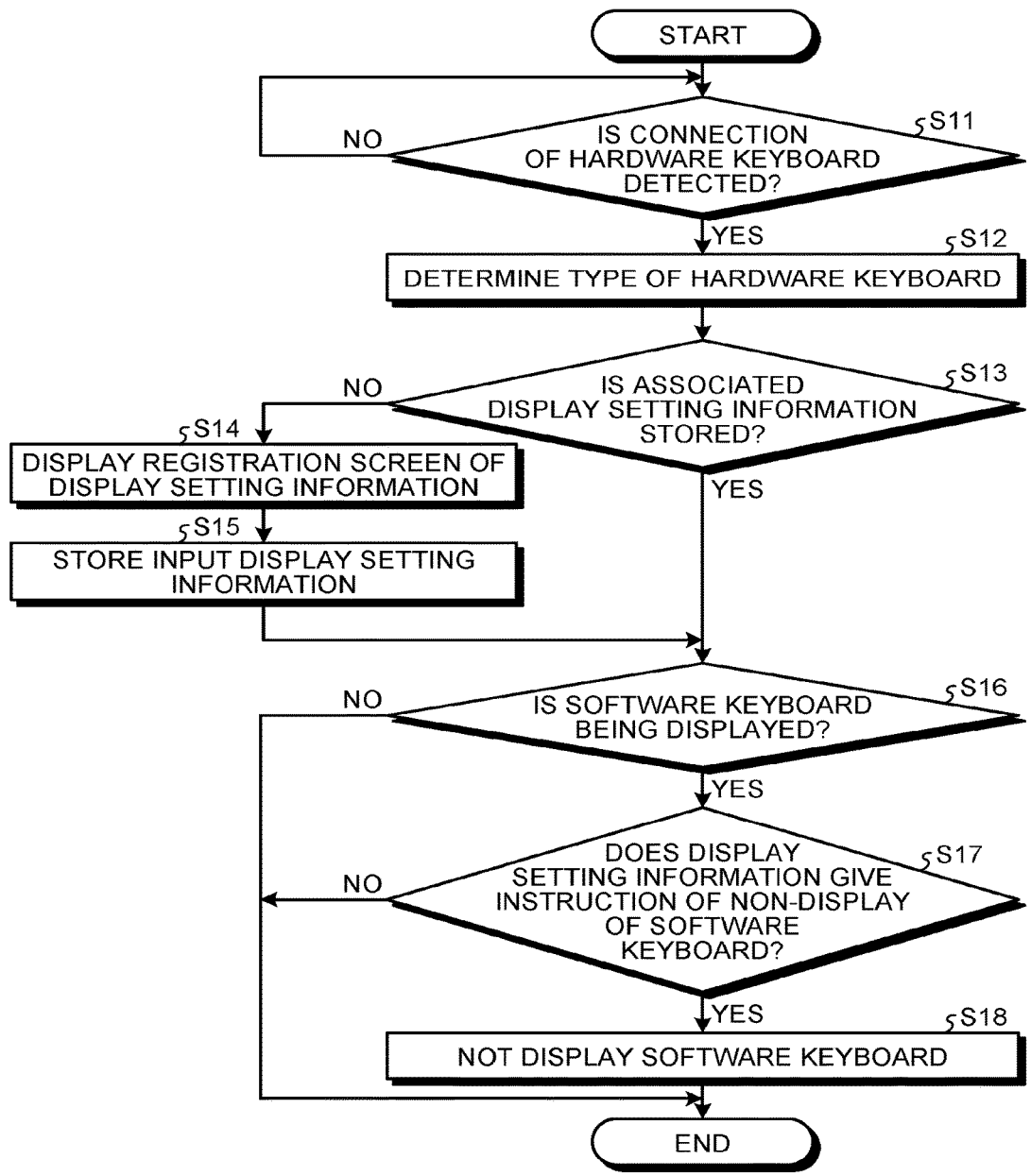
FIG. 4 is a flowchart of an example of a processing to be executed by an operation unit according to the first embodiment.

FIG. 4 is a flowchart of an example of a processing to be executed by the operation unit 20 according to the first embodiment. In FIG. 4, the flowchart illustrates a processing related to the display control of the software keyboard. In this processing, an example of performing a display control based on the display setting information on condition that the software keyboard is being displayed will be explained.

The detector 21 first stands by for the detection of the connection of the hardware keyboard 300 ("No" at step S11). When the detector 21 detects the connection of the hardware keyboard 300 ("Yes" at step S11), the determiner 22 determines the type of the hardware keyboard 300 (step S12).

The display controller 23 then determines whether or not the display setting information associated with the type, obtained at step S12, of the hardware keyboard 300 is stored in the storage unit 24 (step S13). When determining that the display setting information is stored in the storage unit 24 ("Yes" at step S13), the display controller 23 moves to step S16. When determining that the display setting information is not stored in the storage unit 24 ("No" at step S13), the display controller 23 performs a control of displaying a registration screen (see FIG. 5) that encourages registering the display setting information in the display device 210 (step S14).

[Example of Registration Screen]

Figure 5:
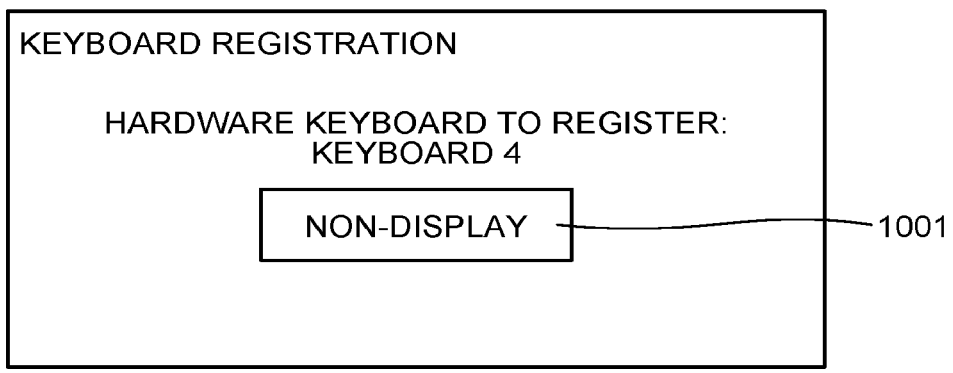
FIG. 5 illustrates an example of a registration screen according to the first embodiment.

FIG. 5 illustrates an example of a registration screen according to the first embodiment. As illustrated in FIG. 5, the registration screen includes an input field 1001 that allows inputting display or non-display of the software keyboard. A user is able to input (set) display or non-display in the input section 1001 via the operation panel 207.

When display or non-display is input in the input field 1001, the storage unit 24 treats the input set value as display setting information, associates the display setting information with the type (type information), determined at step S12, of the hardware keyboard 300, and stores the associated display setting information in the device setting information (step S15).

Subsequently at step S16, the display controller 23 determines whether or not the software keyboard is being displayed in the display device 210 (step S16). When determining that the software keyboard is not being displayed ("No" at step S16), the display controller 23 determines that it does not fall under the applicable condition of the display setting information and ends this processing.

On the other hand, when determining that the software keyboard is being displayed ("Yes" at step S16), the display controller 23 determines whether or not the display setting information associated with the type determined at step S12 gives instruction of non-display of the software keyboard (step S17).

When the display setting information gives instruction of non-display ("Yes" at step S17), the display controller 23 performs a control of not displaying, by closing, the software keyboard (step S18) and ends this processing. When the display setting information gives instruction of display ("No" at step S17), the display controller 23 maintains the display of the software keyboard and ends this processing.

As explained so far according to the first embodiment, the operation unit 20 determines the type of the hardware keyboard 300 connected to the external connection I/F 208 and controls the display of the software keyboard based on the display setting information associated with the type. It is thereby possible in the operation unit 20 to control the display of the software keyboard depending on the type of the hardware keyboard 300 and to improve convenience in operation. For example, the display of the software keyboard is set in the display setting information of the numeric keypad which is the hardware keyboard 300. Thus, it is possible to maintain the display of the software keyboard even when the numeric keypad is connected and thereby to improve convenience in inputting characters.

While the registration screen is displayed when the display setting information associated with the type of the connected hardware keyboard 300 is not stored in the storage unit 24 in the above-explained processing, the timing of displaying the registration screen is not limited thereto. For example, the display controller 23 may perform a control of displaying the registration screen in response to a user operation. An example of a processing when the registration screen is displayed in response to a user operation will be explained below with reference to FIG. 6.

[Processing Flow Concerning Registration Screen Display]

Figure 6:
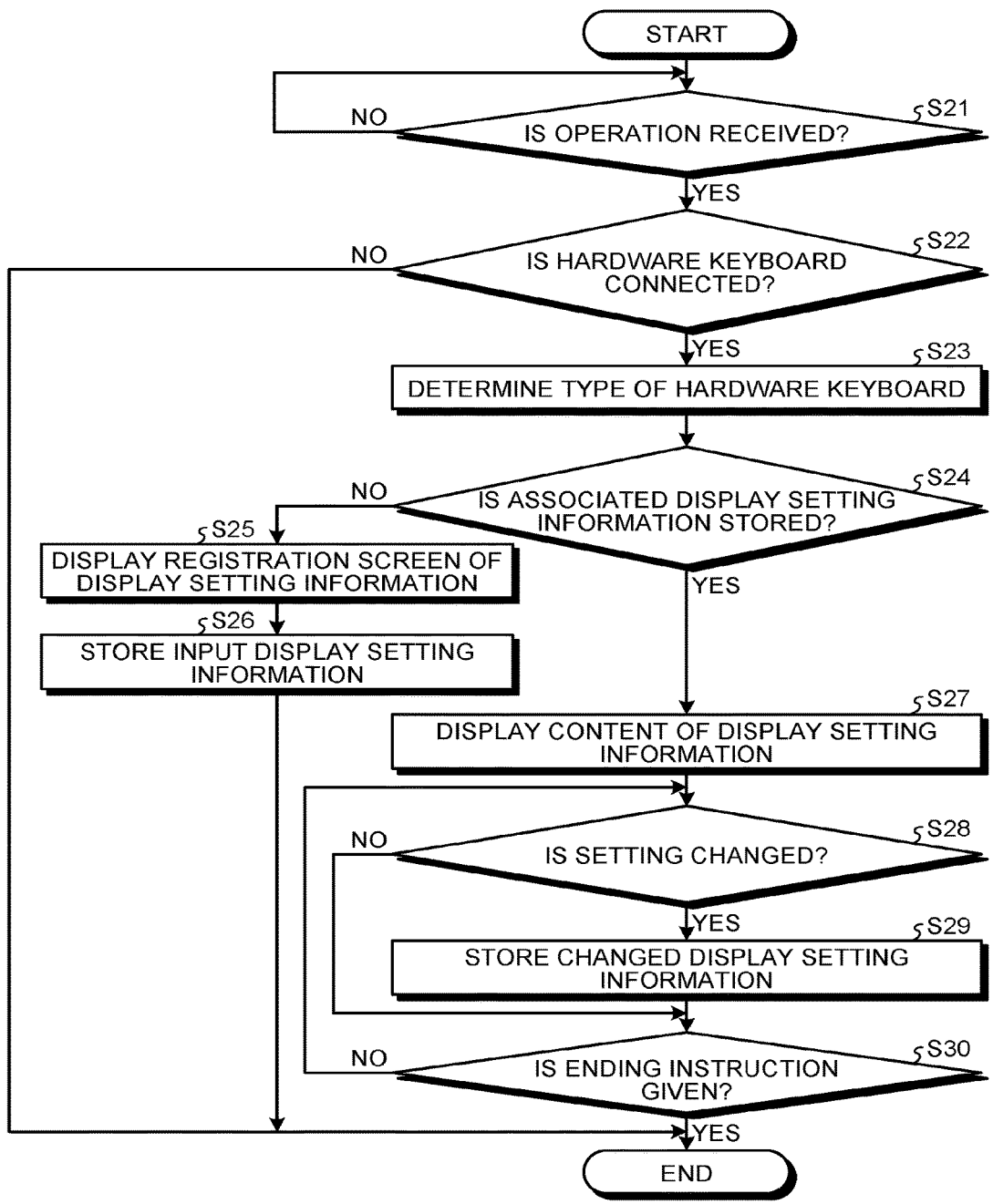
FIG. 6 is another flowchart of an example of a processing to be executed by the operation unit according to the first embodiment.

Here, FIG. 6 is a flowchart of an example of a processing to be executed by the operation unit 20 according to the first embodiment. The flowchart illustrated in FIG. 6 shows a processing related to a display control of the registration screen.

The detector 21 first stands by for a predetermined user operation ("No" at step S21). When the predetermined user operation is performed ("Yes" at step S21), the detector 21 determines whether or not the hardware keyboard 300 is connected (step S22). When the hardware keyboard 300 is not connected ("No" at step S22), the detector 21 ends this processing. Here, the detector 21 may be configured to stand by for the detection of the connection of the hardware keyboard 300.

When it is determined that the hardware keyboard 300 is connected ("Yes" at step S22), the determiner 22 determines the type of the hardware keyboard 300 (step S23).

Next, the display controller 23 determines whether or not the display setting information associated with the type determined at step S23 is stored in the storage unit 24 (step S24). When determining that the display setting information is not stored ("No" at step S24), the display controller 23 performs a control of displaying the registration screen (see FIG. 5) that encourages registering the display setting information in the display device 210 (step S25).

When the display setting information is input based on the registration screen, the storage unit 24 associates with the type (type information) determined at step S23 and stores in the device setting information the display setting information (step S26) and ends this processing.

On the other hand, when determining that the display setting information is stored ("Yes" at step S24), the display controller 23 performs a control of displaying the content of the relevant display setting information in the display device 210 (step S27). Here, the user is able to confirm the display setting information displayed in the display device 210 and change the setting when needed. Here, a screen (a confirmation screen) on which the display setting information is displayed is not especially specified and may be the same as the registration screen (see FIG. 5).

Next, the storage unit 24 determines whether or not the setting of the display setting information is changed (step S28). When the setting is changed ("Yes" at step S28), the storage unit 24 reflects the change of the setting by storing in the storage unit 24 (overwriting) the changed display setting information (step S29) and moves to step S30. Here, when the setting is not changed ("No" at step S28), the processing goes directly to step S30.

At step S30, the display controller 23 determines whether or not a user operation for instruction of ending this processing is performed (step S30). When the ending instruction is not given ("No" at step S30), the processing returns to step S28 again. When the user operation for instruction of ending this processing is given ("Yes" at step S30), the display controller 23 deletes the registration screen and the confirmation screen and ends this processing.

Since a user is able to perform registration, confirmation, and setting change of the display setting information at an arbitrary timing, it is thus possible to improve convenience in managing the display setting information.

While the display controller 23 is configured to control the display of the software keyboard based on the display setting information stored in the storage unit 24 in the first embodiment, the present invention is not limited thereto. For example, when the type of the hardware keyboard 300 determined by the determiner 22 is a numeric keypad, the display controller 23 may automatically perform the control of displaying the software keyboard.

Second Embodiment

In a second embodiment, a configuration capable of individually performing a display control for each of a software full keyboard and a software numeric keypad based on the display setting information will be explained. The same element as that in the first embodiment will be assigned with the same reference symbol and the explanation thereof will be omitted here.

[Functional Configuration of MFP]

Figure 7:
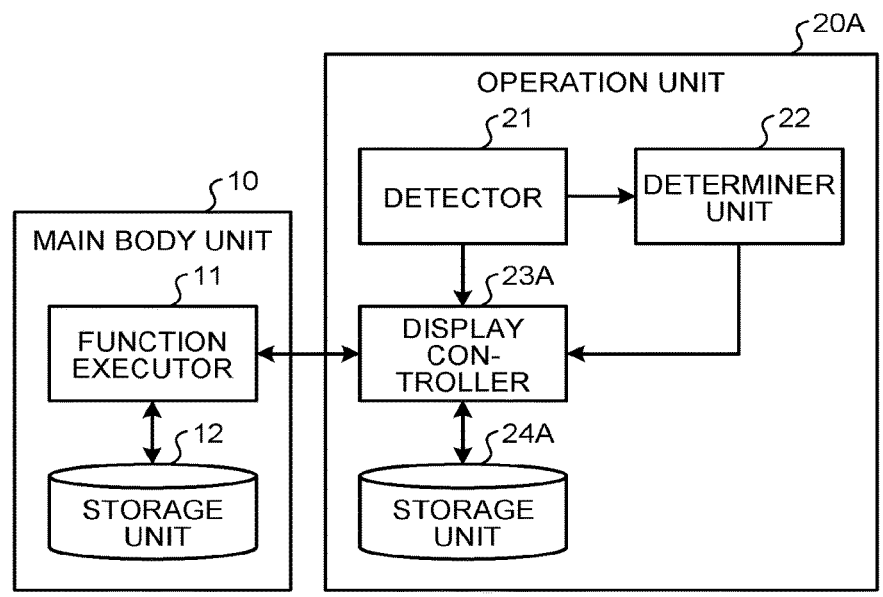
FIG. 7 is a block diagram illustrating an example of a functional configuration of an MFP according to a second embodiment.

FIG. 7 is a block diagram of an example of a functional configuration of an MFP 1 according to a second embodiment. As illustrated in FIG. 7, an operation unit 20A is provided with the detector 21, the determiner 22, a display controller 23A, and a storage unit 24A each as a functional unit. The hardware configuration of the operation unit 20A is the same as the operation unit 20 according to the first embodiment.

The display controller 23A performs a control of displaying information of various kinds in the display device 210 (the operation panel 207), similarly to the display controller 23. The display controller 23A also performs a control of displaying, while switching, the software full keyboard and the software numeric keypad depending on a software keyboard switching operation in the display device 210.

Figure 8:
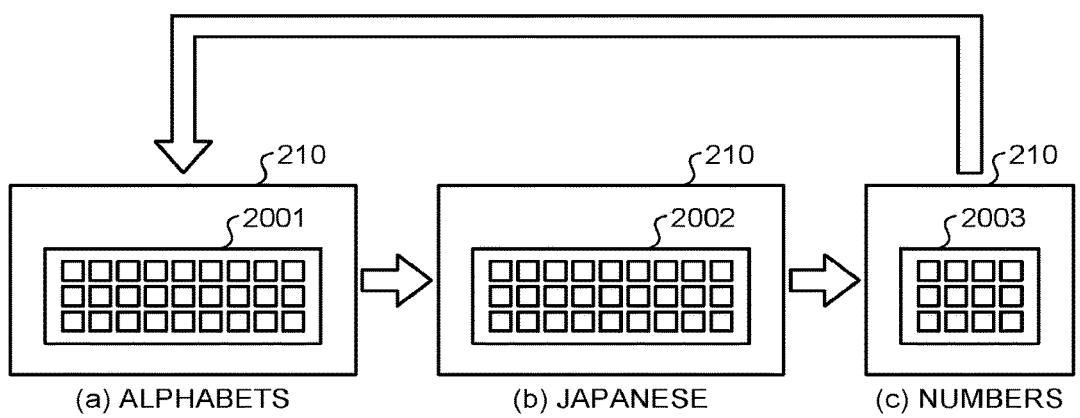
FIG. 8 is an explanatory view of a software keyboard switching operation by a display controller according to the second embodiment.

FIG. 8 is an explanatory view of a software keyboard switching operation by the display controller 23A according to the second embodiment. FIG. 8 illustrates an example in which a software full keyboard for inputting alphabets and a software full keyboard for inputting Japanese can be displayed as software full keyboard.

First of all, (a) of FIG. 8 illustrates an example in which a software full keyboard 2001 for inputting alphabets is displayed in the display device 210. When a switching operation is performed at the state of (a), the display controller 23A performs a control of displaying a software full keyboard 2002 for inputting Japanese in the display device 210 as illustrated in (b). When a switching operation is performed at the state of (b), the display controller 23A performs a control of displaying a software numeric keypad 2003 in the display device 210 as illustrated in (c). Then, when a switching operation is performed at the state of (c), the display controller 23A performs a control of displaying the software full keyboard 2001 for inputting alphabets again in the display device 210 illustrated at (a). In this manner, the display controller 23A performs a control of displaying, while switching, multiple kinds of software keyboards in a predetermined order depending on the switching operation by the user.

When the detector 21 detects the connection of the hardware keyboard 300, the display controller 23A controls the display of the software keyboard depending on the type (type information), determined by the determiner 22, of the hardware keyboard 300. Specifically, the display controller 23A controls respective displays of the software full keyboard and the software numeric keypad based on the device setting information stored in the storage unit 24A.

[Data Structure of Storage Unit]

Figures 9, 10:
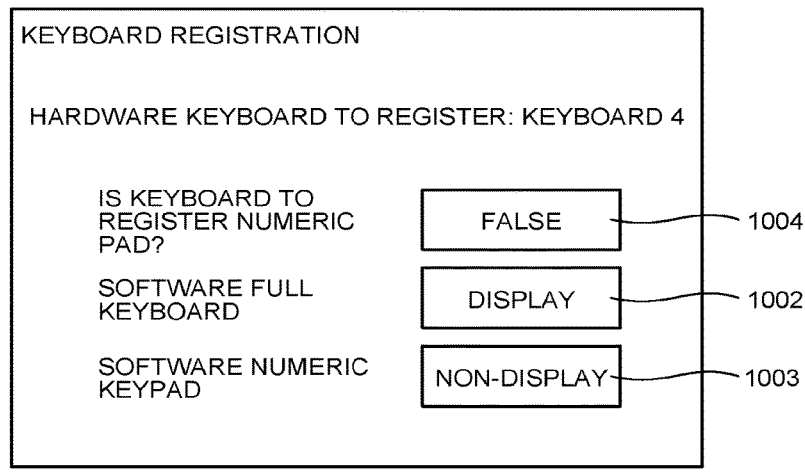
FIG. 9 is a schematic diagram of an example of device setting information stored in a storage unit according to the second embodiment.
FIG. 10 illustrates an example of a registration screen according to the second embodiment.

Here, FIG. 9 is a schematic diagram of an example of device setting information stored in the storage unit 24A according to the second embodiment. As illustrated in FIG. 9, display setting information which gives instruction of display or non-display of the software keyboard is stored by being associated with the type information (device name, manufacturer, and model number) indicating each type of the hardware keyboard 300 in the device setting information. Here, display or non-display is individually set for each of a software full keyboard and a software numeric keypad in the display setting information.

Numeric keypad identifying information in the device setting information in FIG. 9 indicates whether or not the hardware keyboard 300 is a numeric keypad. This numeric keypad identifying information may be obtained by the determiner 22 from the hardware keyboard 300 as type information or may be set manually by the user. Here, the data structure of the device setting information is not limited to what is illustrated in FIG. 9.

The display controller 23A performs a control of displaying a registration screen (see FIG. 10) that encourages registering the display setting information in the display device 210 when the display setting information associated with the type, determined by the determiner 22, of the hardware keyboard 300 is not stored in the storage unit 24A.

[Example of Registration Screen]

FIG. 10 illustrates an example of a registration screen according to the second embodiment. The display controller 23A performs a control of displaying the registration screen in FIG. 10 when the display setting information associated with the type of the hardware keyboard 300 is not stored in the storage unit 24A or when a user performs a predetermined operation.

As illustrated in FIG. 10, the registration screen includes input fields 1002 and 1003 that allow inputting display or non-display for each of the software full keyboard and the software numeric keypad. The registration screen also includes an input field 1004 that allows inputting numeric keypad identifying information. The user is able to input (set) display or non-display in the input fields 1002 and 1003 via the operation panel 207. Besides, the user is able to input (set) information of instruction about whether or not the keyboard is a numeric keypad (TRUE, FALSE) in the input field 1004.

The storage unit 24A treats setting values input in the input fields 1002 and 1003 as the display setting information and treats a setting value input in the input field 1004 as the numeric keypad identifying information. The storage unit 24A associates the input display setting information and the numeric keypad identifying information with the type (type information), determined by the determiner 22, of the hardware keyboard 300 and stores the associated information in the device setting information.

[Processing Flow Concerning Software Keyboard Display]

Figure 11:
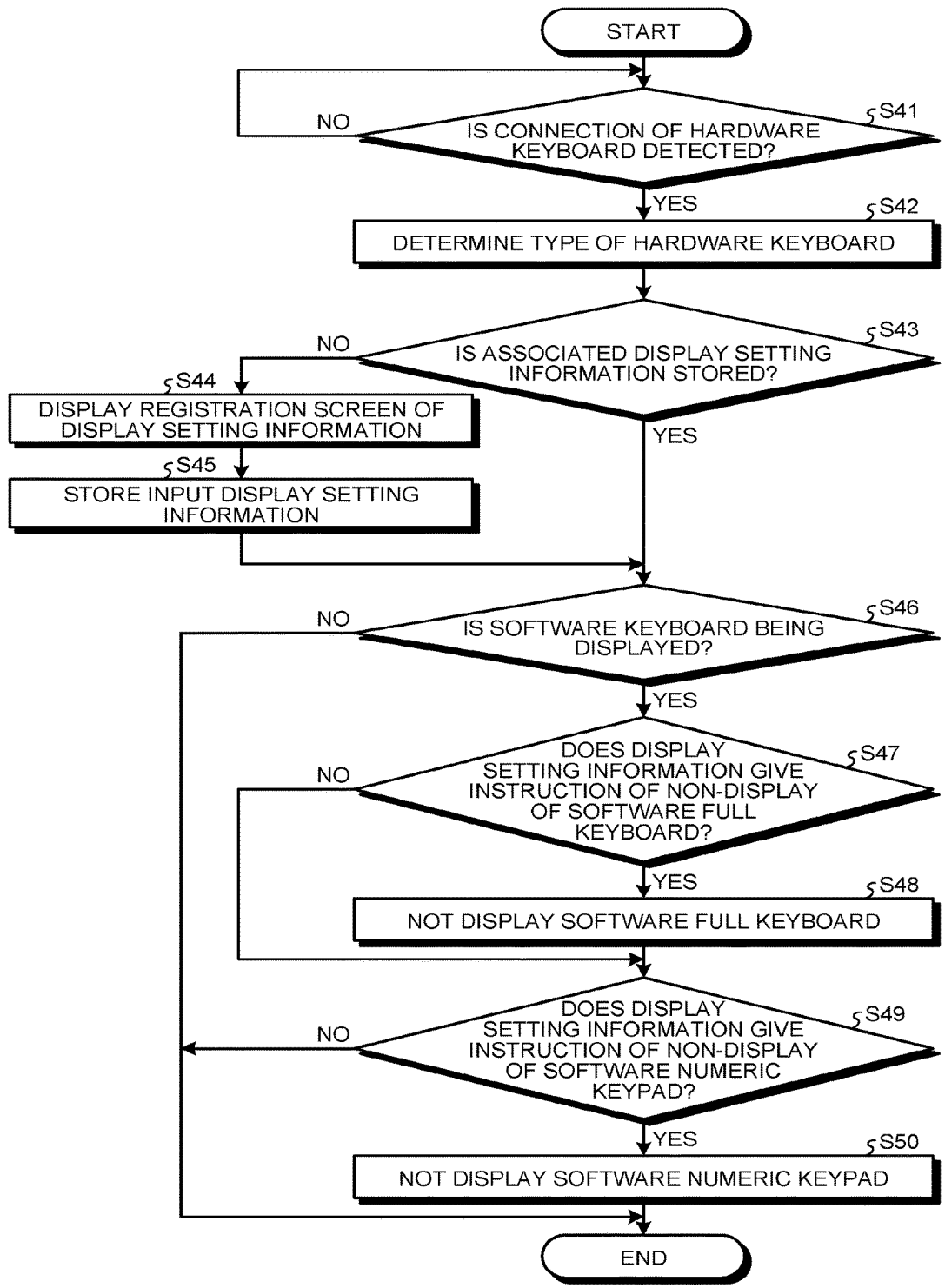
FIG. 11 is a flowchart of an example of a processing to be executed by an operation unit according to the second embodiment.

FIG. 11 is a flowchart of an example of a processing to be executed by the operation unit 20A according to the second embodiment. In the flowchart in FIG. 11, a processing related to a display control of the software keyboard is illustrated. Steps S41 to S46 are the same as steps S11 to S16 according to the first embodiment and therefore the explanation thereof will be omitted here.

When determining that the software keyboard is being displayed ("Yes" at step S46), the display controller 23A determines whether or not the display setting information associated with the type determined at step S42 gives an instruction of non-display of the software full keyboard (step S47). When the display setting information gives an instruction of non-display of the software full keyboard ("Yes" at step S47), the display controller 23A performs a control of not displaying the software full keyboard (step S48) and moves to step S49. When the display setting information gives an instruction of display of the software full keyboard ("No" at step S47), the display controller 23A moves to step S49.

Next at step S49, the display controller 23A determines whether or not the display setting information gives instruction of non-display of the software numeric keypad (step S49). When the display setting information gives instruction of non-display of the software numeric keypad ("Yes" at step S49), the display controller 23A performs a control of not displaying the software numeric keypad (step S50) and ends this processing. When the display setting information gives instruction of display of the software numeric keypad ("No" at step S49), the display controller 23A ends this processing.

For example, when instruction of non-display of the software full keyboard and the software numeric keypad is given in the display setting information, the display controller 23A performs a control of not displaying the software full keyboard and the software numeric keypad. When instruction of display of the software full keyboard and the software numeric keypad is given in the display setting information, the display controller 23A performs a control of displaying the software full keyboard and the software numeric keypad. In this case, the display controller 23A performs a control of displaying, while switching, respective types of software keyboards, i.e., the software full keyboard 2001, the software full keyboard 2002, and the software numeric keypad 2003 illustrated in FIG. 8 in this order.

When instruction of display of the software full keyboard and non-display of the software numeric keypad is given in the display setting information, the display controller 23A performs a control of not displaying the software numeric keypad. In this case, the display controller 23A eliminates the software numeric keypad 2003 from the switching order of the software keyboards explained with reference to FIG. 8. In other words, the display controller 23A performs a control of displaying, while switching, the software full keyboard 2001 and the software full keyboard 2002 when the switching operation is performed by a user.

When instruction of non-display of the software full keyboard and display of the software numeric keypad is given in the display setting information, the display controller 23A performs a control of not displaying the software full keyboard. In this case, the display controller 23A eliminates the software full keyboards 2001 and 2002 from the switching order of the software keyboards explained with reference to FIG. 8. In other words, the display controller 23A performs a control of displaying only the software numeric keypad 2003 even when the switching operation is performed.

As explained so far according to the second embodiment, the operation unit 20A determines the type of the hardware keyboard 300 connected to the external connection I/F 208 and controls the display of the software full keyboard and the software numeric keypad individually based on the display setting information associated with each type. It is thereby possible in the operation unit 20A to control the display of the software keyboard depending on the type of the hardware keyboard 300 and to improve convenience in operation. For example, display of the software full keyboard and non-display of the software numeric keypad are set in the display setting information of the numeric keypad which is the hardware keyboard 300. Thus, it is possible to display the software full keyboard even when the numeric keypad is connected and thereby to improve convenience in inputting characters.

While the display controller 23A is configured to control the display of the software keyboard based on the display setting information stored in the storage unit 24A in the second embodiment, the present invention is not limited thereto. Specifically, the display controller 23A may automatically perform a control of not displaying the software keyboard whose type is the same as the type, determined by the determiner 22, of the hardware keyboard 300. For example, the display controller 23A may automatically perform a control of not displaying the software numeric keypad when the type of the hardware keyboard 300 is determined to be a numeric keypad.

Third Embodiment

In a third embodiment, a configuration capable of performing a display control based on display setting information for each kind of the functions (applications) to be executed in the main body unit 10 will be explained. The same element as that in the above-explained embodiments will be assigned with the same reference symbol and the explanation thereof will be omitted here.

[Functional Configuration of MFP]

Figures 12, 13:
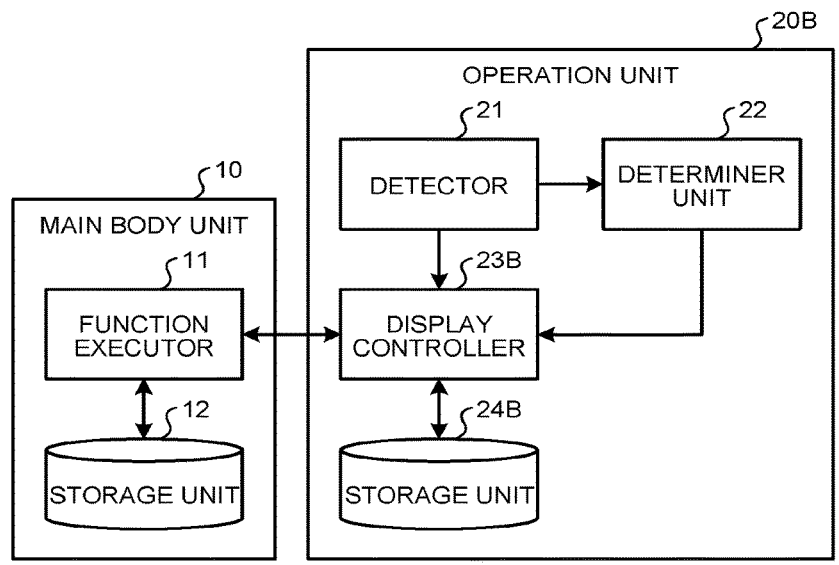
FIG. 12 is a block diagram illustrating an example of a functional configuration of an MFP according to a third embodiment.
FIG. 13 is a schematic diagram of an example of device setting information stored in a storage unit according to the third embodiment.

FIG. 12 is a block diagram of an example of a functional configuration of an MFP 1 according to a third embodiment. As illustrated in FIG. 12, an operation unit 20B is provided with the detector 21, the determiner 22, a display controller 23B, and a storage unit 24B each as a functional unit. The hardware configuration of the operation unit 20B is the same as the operation unit 20 according to the first embodiment.

The display controller 23B performs a control of displaying information of various kinds in the display device 210 (the operation panel 207), similarly to the display controller 23. The display controller 23B also performs a control of displaying, while switching, the software full keyboard and the software numeric keypad in the display device 210 depending on a software keyboard switching operation, similarly to the display controller 23A.

When the detector 21 detects the connection of the hardware keyboard 300, the display controller 23B controls the display of the software keyboard depending on the type (type information), determined by the determiner 22, of the hardware keyboard 300. Specifically, the display controller 23B controls respective displays of the software full keyboard and the software numeric keypad based on the device setting information stored in the storage unit 24B.

[Data Structure of Storage Unit]

FIG. 13 is a schematic diagram of an example of device setting information stored in the storage unit 24B according to the third embodiment. As illustrated in FIG. 13, display setting information which gives instruction of display or non-display of the software keyboard is stored by being associated with the type information (device name, manufacturer, and model number) indicating each type of the hardware keyboard 300 in device setting information. Here, display or non-display is individually set for each of the software full keyboard and software numeric keypad in the display setting information, similarly to the second embodiment.

The display setting information is set for each piece of application kind information that indicates the kind of the application to be executed in the main body unit 10. For example, display/non-display of the software full keyboard and the software numeric keypad is enabled to be set individually for each of a scanner application, a copy application, a printer application, and a facsimile application to be executed in the main body unit 10 in FIG. 13. The data structure of the device setting information is not limited to what is illustrated in FIG. 13.

The display controller 23B performs a control of displaying a registration screen that encourages registering the display setting information in the display device 210 when the display setting information associated with the type information obtained by the detector 21 is not stored in the storage unit 24B.

[Example of Registration Screen]

FIG. 14 illustrates an example of a registration screen according to the third embodiment. The display controller 23B performs a control of displaying the registration screen in FIG. 14 when the display setting information associated with the type of the hardware keyboard 300 is not stored in the storage unit 24B or when the user performs a predetermined operation.

As illustrated in FIG. 14, the registration screen includes input fields 1005 and 1006 that allow setting display or non-display for the software full keyboard and the software numeric keypad for each application kind. A user is able to input (set) display or non-display in the input fields 1005 and 1006 for each application kind via the operation panel 207.

The storage unit 24B treats setting values input in the input fields 1005 and 1006 for each application kind as display setting information concerning corresponding application kind information. The storage unit 24B associates the display setting information with the type (type information), determined by the determiner 22, of the hardware keyboard 300 and stores the associated information in the device setting information.

[Processing Flow Concerning Software Keyboard Display]

Figure 15:
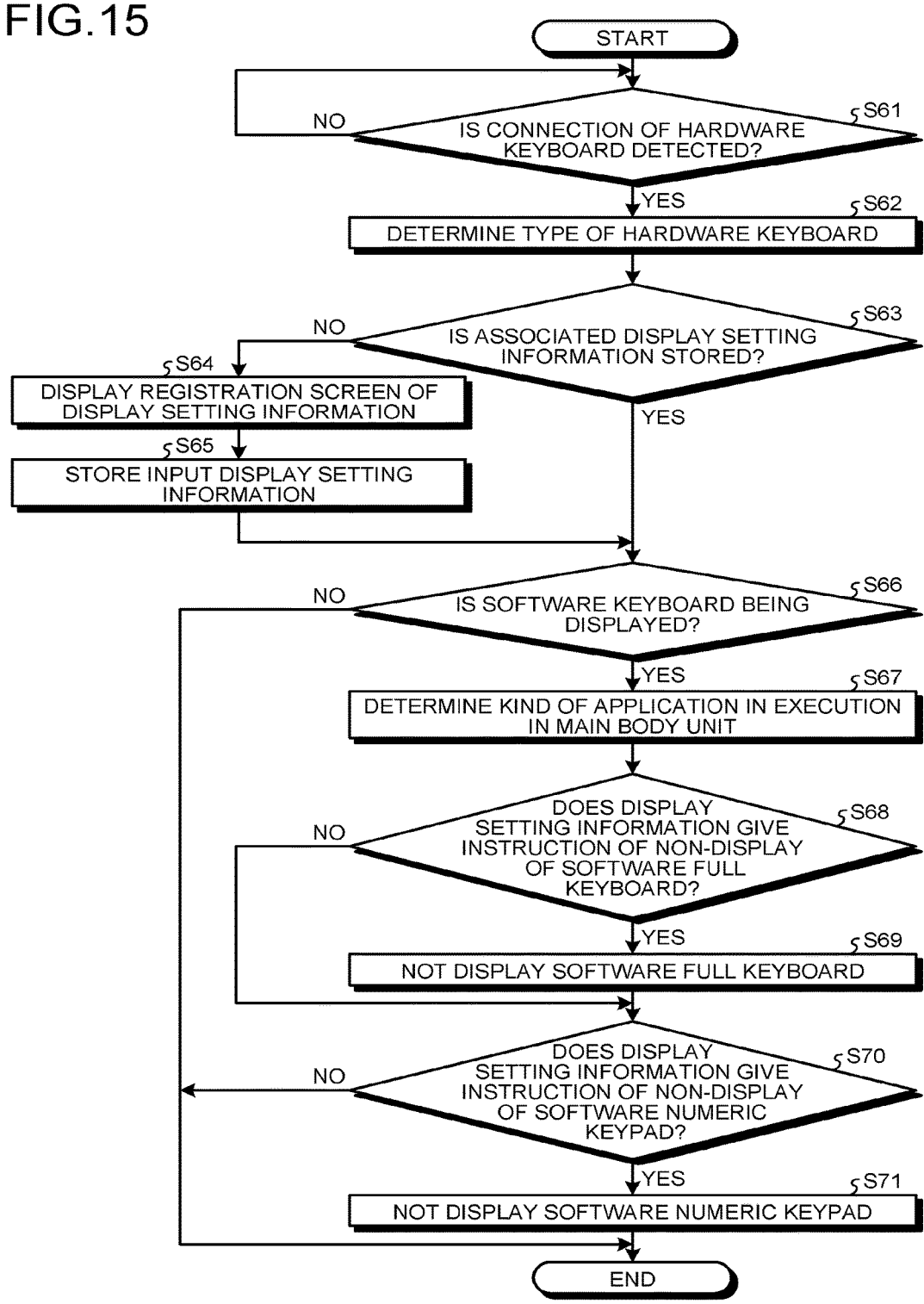
FIG. 15 is a flowchart of an example of a processing to be executed by an operation unit according to the third embodiment.

FIG. 15 is a flowchart of an example of a processing to be executed by the operation unit 20B according to the third embodiment. In the flowchart in FIG. 15, a processing related to a display control of the software keyboard is shown. Steps S61 to S66 are the same as steps S11 to S16 according to the first embodiment and therefore the explanation thereof will be omitted here.

When determining that the software keyboard is being displayed ("Yes" at step S66), the display controller 23B determines the kind of the application which is in the middle of execution in the main body unit 10 (step S67). Here, whatever method may be adopted for determining the application kind. For example, the display controller 23B may be configured to obtain the application kind information indicating the application kind which is in the middle of execution by the function executor 11 from the function executor 11. Since displaying a screen appropriate to the application executed by the function executor 11, the display controller 23B may determine the application kind based on the screen.

Subsequently, the display controller 23B determines whether or not the display setting information associated with the type and the kind respectively determined at steps S62 and S67 gives instruction of non-display of the software full keyboard (step S68). When the display setting information gives instruction of non-display of the software full keyboard ("Yes" at step S68), the display controller 23B performs a control of not displaying the software full keyboard (step S69) and moves to step S70. When the display setting information gives instruction of display of the software full keyboard ("No" at step S68), the display controller 23B moves to step S70.

Next at step S70, the display controller 23B determines whether or not the display setting information gives instruction of non-display of the software numeric keypad (step S70). When the display setting information gives instruction of non-display of the software numeric keypad ("Yes" at step S70), the display controller 23B performs a control of not displaying the software numeric keypad (step S71) and ends this processing. When the display setting information gives instruction of display of the software numeric keypad ("No" at step S70), the display controller 23B ends this processing.

For example, when instruction of display of the software full keyboard and the software numeric keypad is given in the display setting information with respect to the copy application, the display controller 23B performs a control of displaying the software full keyboard and the software numeric keypad while the function executor 11 executes the copy application. When instruction of non-display of the software full keyboard and the software numeric keypad is given in the display setting information with respect to the printer application, the display controller 23B performs a control of not displaying the software full keyboard and the software numeric keypad while the function executor 11 executes the scanner application.

When instruction of display of the software full keyboard and non-display of the software numeric keypad is given in the display setting information with respect to the scanner application, the display controller 23B performs a control of not displaying the software numeric keypad while the function executor 11 executes the scanner application. In this case, the display controller 23B eliminates the software numeric keypad 2003 from the switching order of the software keyboards explained with reference to FIG. 8.

When instruction of non-display of the software full keyboard and display of the software numeric keypad is given in the display setting information with respect to the facsimile application, the display controller 23B performs a control of not displaying the software full keyboard while the function executor 11 executes the facsimile application. In this case, the display controller 23B eliminates the software full keyboards 2001 and 2002 from the switching order of the software keyboards explained with reference to FIG. 8.

As explained so far according to the third embodiment, the operation unit 20B controls the display of the software keyboard based on the display setting information associated with the type of the hardware keyboard 300 connected to the external connection I/F 208 and the kind of the application which is in the middle of execution in the main body unit 10. Thus, it is possible in the operation unit 20B to control the display of the software keyboard depending on the type of the hardware keyboard 300 and the kind of the application in execution and thereby to improve convenience in operation. For example, display of the software numeric keypad is set as for functions (copy, facsimile, and the like) which require inputting numbers like the number of sheets of paper, a telephone number, and the like. It is thereby possible to use the software numeric keypad even when the hardware keyboard 300 is connected and to improve convenience in inputting numbers.

While the embodiments of the present invention are explained so far, the embodiments are only exemplary instances and not intended to limit the scope of the invention. The embodiments may be implemented in other various forms and various omissions, replacements, modifications, and additions may be made without departing from the spirit and the scope of the invention. The embodiments and the modifications thereof come within the scope of the invention indicated by the appended claims and the scope of equivalents thereof as well as the scope and the spirit of the invention.

For example, while the example in which the present invention is applied to the operation unit 20 of the MFP 1 is explained in the embodiments, an information processing apparatus as an application target is not limited thereto. For example, the present invention may be applied to a portable information processing apparatus such as a PC and a tablet terminal.

Besides, while being provided separately in the embodiments, the main body unit 10 and the operation unit (20A, 20B) may be provided as an integrated unit. The operation unit 20 (20A, 20B) may be provided with the functions of the function executor 11.

Each function corresponding to a program to be executed in the main body unit 10 and the operation unit 20 (20A, 20B) according to the embodiments can be implemented by ASIC (Application Specific Integrated Circuits) and a device configured by connecting a conventional circuit module. In other words, each of the functions described in the embodiments can be realized by at least one processing circuit. Here, the "processing circuit" in this specification is configured to include: a processor (the CPU 101, 201, for example) that realizes the functional units in cooperation with programs; and hardware such as the ASIC designed to realize the functional units and a circuit module.

Programs to be executed in the main body unit 10 and the operation unit 20 (20A, 20B) according to the embodiments may be provided by being recorded in a file of an installable format or of an executable format in a computer-readable recording medium such as a Floppy® disc, a CD (Compact Disc), a CD-R (Compact Disc-Recordable), a CD-ROM (Compact Disc Read Only Memory), a DVD (Digital Versatile Disc), an SD memory card, and a USB memory (Universal Serial Bus memory) as a computer program product.

The programs to be executed in the main body unit 10 and the operation unit 20 (20A, 20B) according to the embodiments may be provided by being stored on a computer connected to a network such as the Internet and downloaded via the network. The programs to be executed in the main body unit 10 and the operation unit 20 (20A, 20B) according to the embodiments may be provided or distributed via a network such as the Internet.

According to the embodiments, there is an advantage in that a display of a software keyboard can be controlled depending on a type of a hardware keyboard.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus, comprising:
a display device;
an interface to which a hardware keyboard is connectable;
a memory to store display setting information associating, for each hardware keyboard of one or more types of hardware keyboards, a display setting indicating whether a corresponding software keyboard should be displayed or not displayed when the hardware keyboard is connected to the interface; and
circuitry configured to
detect that a particular hardware keyboard is connected to the interface,
determine a type of the detected particular hardware keyboard,
determine whether a particular software keyboard associated with the detected particular hardware keyboard in the memory should be displayed or not, based on the determined type of the detected particular hardware keyboard and the display setting information stored in the memory,
when determining that the particular software keyboard should be displayed based on the type of the detected hardware keyboard, display the particular software keyboard, and
when determining that the particular software keyboard should not be displayed based on the type of the detected hardware keyboard, not display the particular software keyboard.

2. The information processing apparatus according to claim 1, wherein
the circuitry is further configured to control displaying multiple kinds of software keyboards, and
the memory stores the display setting information set for each kind of the multiple kinds of software keyboards so that pieces of the display setting information are associated with respective types of the hardware keyboard.

3. The information processing apparatus according to claim 2, wherein the circuitry is further configured to control displaying, while switching in a predetermined order, the multiple kinds of the software keyboards, and eliminate a software keyboard kind whose non-display instruction is given in the display setting information from the order.

4. The information processing apparatus according to claim 2, wherein the circuitry is further configured to control displaying, as the multiple kinds of the software keyboards, a keyboard image for inputting characters and a numeric keypad image for inputting numbers in the display device.

5. The information processing apparatus according to claim 1, wherein
the memory stores the display setting information set for each kind of an application so that pieces of the display setting information are associated with respective kinds of the software keyboard, and
the circuitry is further configured to control the display of the particular software keyboard based on a piece of the display setting information associated with the determined type of the hardware keyboard and with a kind of the application to be executed.

6. The information processing apparatus according to claim 1, wherein
the circuitry is further configured to control displaying a registration screen that encourages registering the display setting information in the display device, and
the memory stores the display setting information set based on the registration screen so that the display setting information is associated with the determined type of the hardware keyboard.

7. The information processing apparatus according to claim 6, wherein the circuitry is further configured to control the displaying of the registration screen in the display device when the display setting information associated with the determined type of the hardware keyboard is not stored in the memory.

8. The information processing apparatus according to claim 1, the circuitry includes a processor and a processing memory.

9. The information processing apparatus of claim 1, wherein the circuitry is configured to determine the type of the detected hardware keyboard, which is at least one of a name, a manufacturer, and a model of the detected hardware keyboard.

10. The information processing apparatus according to claim 1, wherein the circuitry is further configured to
obtain type information, which the detected hardware keyboard retains, from the detected hardware keyboard connected to the interface, and
determine the type of the detected hardware keyboard based on the obtained type information.

11. The information processing apparatus according to claim 1, wherein the circuitry is further configured to control, when detecting that the particular hardware keyboard is connected to the interface, display of the particular software keyboard, depending on the determined type of the detected particular hardware keyboard.

12. The information processing apparatus according to claim 1, wherein the display setting stored in the memory is a flag that is set to one of display and non-display for each of the one or more types of hardware keyboards, and the circuitry is further configured to determine not to display the particular software keyboard associated with the detected particular hardware keyboard only when the display setting in the memory is set to non-display.

13. The information processing apparatus according to claim 1, wherein the circuitry is further configured not to display the particular software keyboard being displayed when the particular hardware keyboard is connected to the interface while the particular software keyboard is being displayed on the display device.

14. The information processing apparatus according to claim 4, wherein the circuitry is further configured not to display one of the keyboard image for inputting characters and the numeric keypad image for inputting numbers on the display device depending on the type of the particular hardware keyboard when the particular hardware keyboard is connected to the interface while the particular software keyboard is being displayed on the display device.

15. A display controlling method to be executed by an information processing apparatus including a display device and an interface to which a hardware keyboard is connectable, the display controlling method comprising:
storing, in a memory, display setting information associating, for each hardware keyboard of one or more types of hardware keyboards, a display setting indicating whether a corresponding software keyboard should be displayed or not displayed when the hardware keyboard is connected to the interface; and
detecting that a particular hardware keyboard is connected to the interface;
determining a type of the particular hardware keyboard detected in the detecting step;
determining whether a particular software keyboard associated with the detected particular hardware keyboard in the memory should be displayed or not, based on the determined type of the detected particular hardware keyboard and the display setting information stored in the memory,
when determining that the particular software keyboard should be displayed based on the type of the detected hardware keyboard, displaying the particular software keyboard, and
when determining that the particular software keyboard should not be displayed based on the type of the detected hardware keyboard, not displaying the particular software keyboard.

16. A non-transitory computer-readable recording medium with an executable program stored thereon, wherein the program instructs processing circuitry of an information processing apparatus, which includes a display device and an interface to which a hardware keyboard is connectable, to perform:
storing, in a memory, display setting information associating, for each hardware keyboard of one or more types of hardware keyboards a display setting indicating whether a corresponding software keyboard should be displayed or not displayed when the hardware keyboard is connected to the interface; and
detecting that a particular hardware keyboard is connected to the interface;
determining a type of the particular hardware keyboard detected in the detecting step;
determining whether a particular software keyboard associated with the detected particular hardware keyboard in the memory should be displayed or not, based on the determined type of the detected particular hardware keyboard and the display setting information stored in the memory,
when determining that the particular software keyboard should be displayed based on the type of the detected hardware keyboard, displaying the particular software keyboard, and
when determining that the particular software keyboard should not be displayed based on the type of the detected hardware keyboard, not displaying the particular software keyboard.

* * * * *